(12) United States Patent
Bettinzoli

(10) Patent No.: US 7,001,176 B2
(45) Date of Patent: Feb. 21, 2006

(54) BURNER WITH INTERNAL SEPARATOR

(75) Inventor: Angelo Bettinzoli, Concesio (IT)

(73) Assignee: Sabaf S.p.A., (IT)

(*) Notice: Subject to any disclaimer, the term of this patent is extended or adjusted under 35 U.S.C. 154(b) by 0 days.

(21) Appl. No.: 10/332,191

(22) PCT Filed: Jun. 15, 2001

(86) PCT No.: PCT/IB01/01053

§ 371 (c)(1),
(2), (4) Date: Jul. 30, 2003

(87) PCT Pub. No.: WO02/02991

PCT Pub. Date: Jan. 10, 2002

(65) Prior Publication Data

US 2004/0029063 A1    Feb. 12, 2004

(30) Foreign Application Priority Data

Jul. 23, 2003  (IT) .......................... MI2000A1523

(51) Int. Cl.
*F23D 14/62* (2006.01)
(52) U.S. Cl. ..................... 431/354; 126/39 R
(58) Field of Classification Search ............... 401/354, 401/217, 239, 245; 126/39 R
See application file for complete search history.

(56) References Cited

U.S. PATENT DOCUMENTS 6,299,436 B1 * 10/2001 Huang ........................ 431/354
6,318,993 B1 * 11/2001 Huang ........................ 431/354
6,325,619 B1 * 12/2001 Dane ........................... 431/284
6,607,378 B1 *  8/2003 Harneit et al. ............... 431/354
6,655,954 B1 * 12/2003 Dane ........................... 431/354

FOREIGN PATENT DOCUMENTS

| EP | 0634608 A2 | 1/1995 |
| EP | 0797048 A1 | 9/1997 |
| EP | 0903538 A1 | 3/1999 |
| EP | 0908682 A1 | 4/1999 |
| EP | 0945679 A1 | 9/1999 |
| WO | WO 99/11975 * | 3/1999 |
| WO | WO9911975 A1 | 3/1999 |

OTHER PUBLICATIONS

Patent Abstracts of Japan, vol. 1999, No. 10, Aug. 31, 1999 & JP 11 125405 A (Osaka Gas Co Ltd), May 11, 1999 abstract.

* cited by examiner

Primary Examiner—Alfred Basichas
(74) Attorney, Agent, or Firm—Lerner, David, Littenberg, Krumholz & Mentlik, LLP

(57) ABSTRACT

The invention relates to a burner (1) for cookers, suitable for burning gas, comprising at least two gas crowns, of which one central one and at least one circumferential one, a mixing chamber (13) with Venturi effect, ducts for entry of the primary air and radial ducts (9) for feeding the gas/primary air mixture to the said at least one circumferential crown, comprising a body (3), a head (2) and a separation element (4) that breaks up the internal space into ducts for entry of the primary air and ducts for distribution of the gas/primary air mixture.

11 Claims, 8 Drawing Sheets

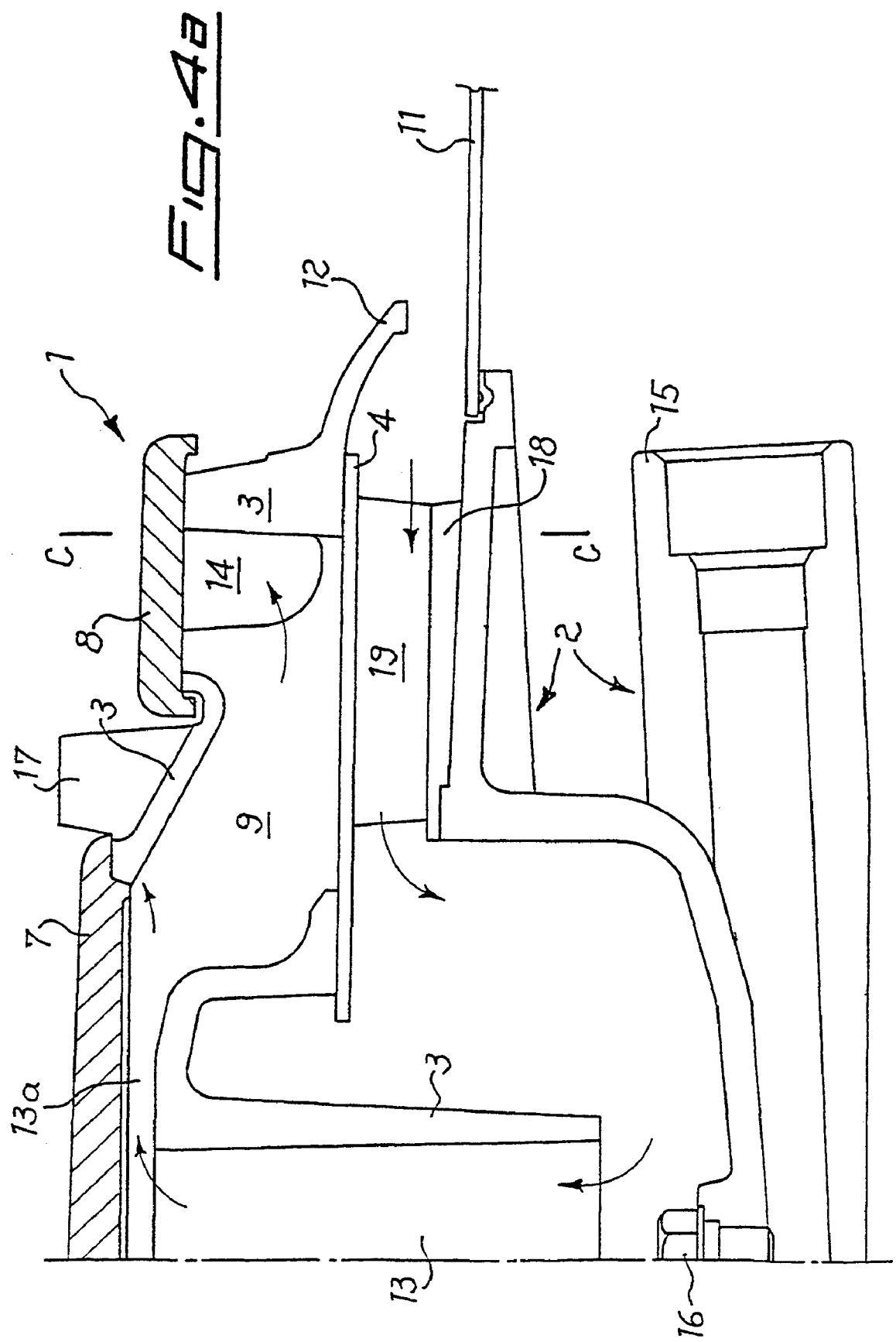

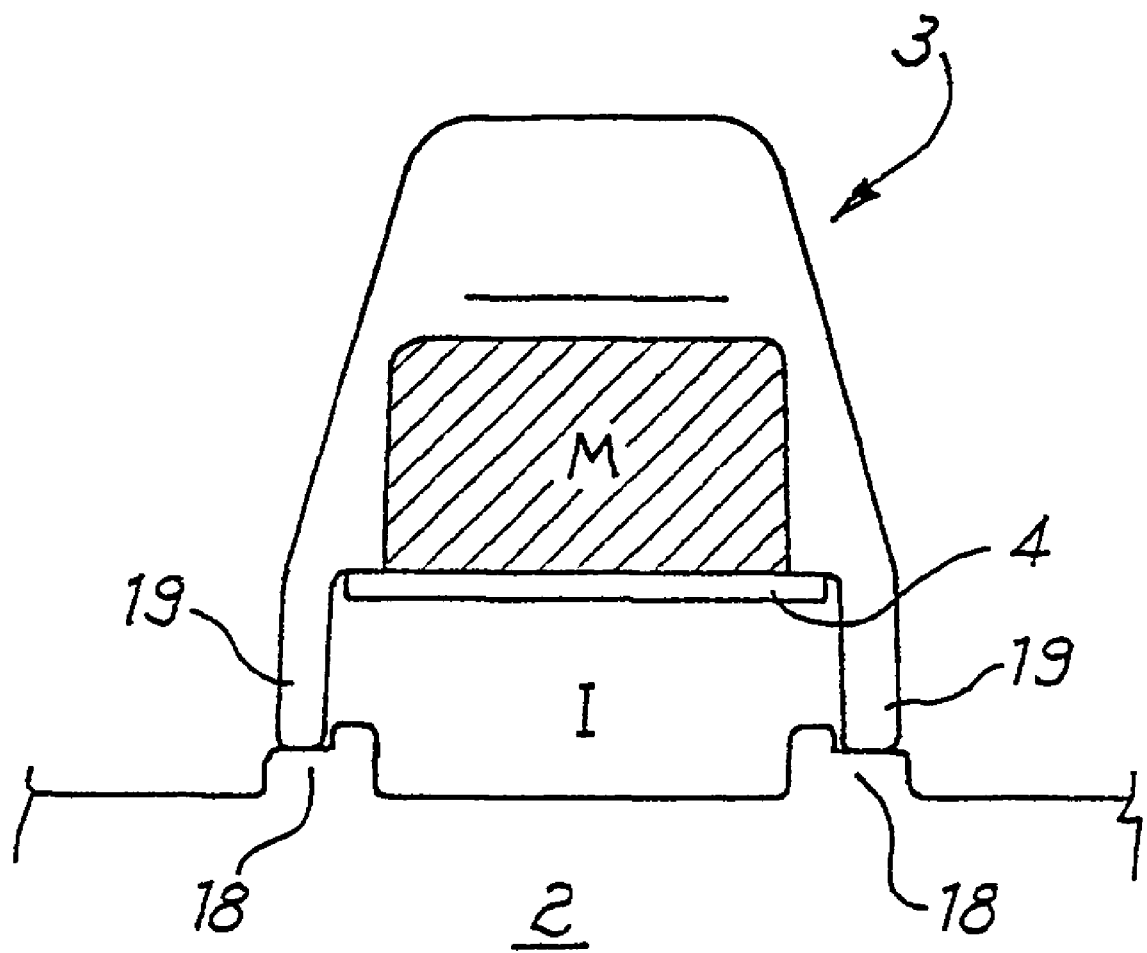

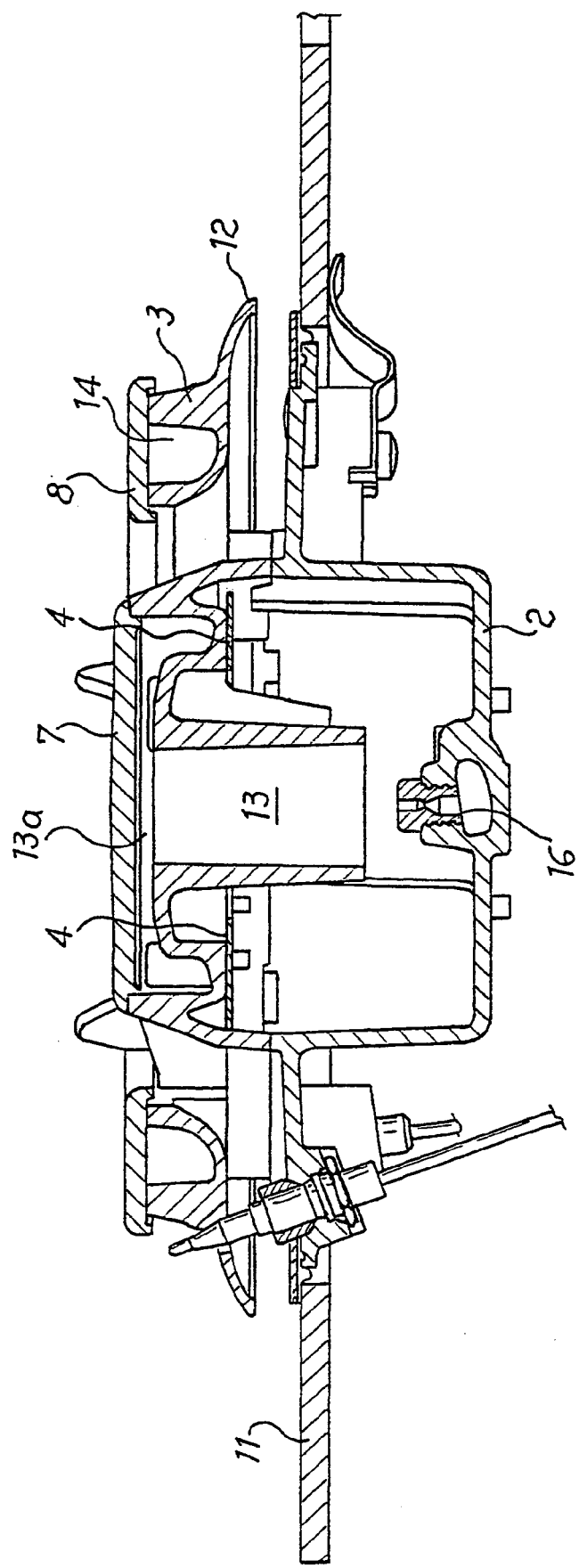

BURNER WITH INTERNAL SEPARATOR

TECHNICAL FIELD

The present invention relates to a burner for cookers equipped with two or more gas crowns, more in particular a burner suitable for use in built-in cooking surfaces.

BACKGROUND ART

There are known burners for cookers provided with two or three gas crowns, in particular burners with three crowns, a central one and two outer ones, one facing the inside and one facing the outside of the burner.

This type of burner enables uniform heating of the pans that are set on them irrespective of the shape and size of the pans.

In the European patent application EP 0 797 048 in the name of the present applicant, a burner with three gas crowns is described which is provided with a horizontal Venturi made in a chamber formed between a base of the burner and an upper portion comprising the central gas crown. The chamber of the Venturi communicates with an upper chamber defined by the bottom of the area of central crown and by the central burner cap. This burner is substantially formed by three die-cast pieces which are then assembled together.

In the European patent application 0 903 538 in the name of the present applicant, an improved burner is described, which likewise has the characteristic of comprising three concentric gas crowns and means for feeding the gas/primary air mixture to said crowns. The said burner is made up of just two die-cast pieces, and the chamber with Venturi effect, which is substantially horizontal, is defined by the surfaces set facing one another, one of which corresponding to the body of the burner and the other to the cap of the central gas crown. Notwithstanding the advantage of being made up of just two die-cast pieces, this burner presents, however, certain drawbacks; in particular, using just two die-cast pieces it is not possible to make, inside the burner, all the ducts necessary for the passage of the primary air and of the gas/primary air mixture. In fact, in this burner, the ducts that carry the gas/primary air mixture from the mixing chamber to the circumferential crowns are not altogether made in the body of the burner, but are defined by ducts delimited at the top only by planar appendages that join the central cap to the annular burner cap, a solution which is not ideal given the consequent inevitable leakages of mixture and the possibility of undesired displacements of said burner caps.

DISCLOSURE OF INVENTION

The purpose of the present invention is to overcome the drawbacks presented by the burners described above by providing a burner made up of just two die-cast pieces and equipped with the ducts for distributing the gas/primary air mixture from the mixing chamber to the circumferential crowns made inside the burner itself.

According to one aspect, the invention relates to a burner for built-in cookers, suitable for burning gas, comprising two or more gas crowns, of which one central one and at least one circumferential one, comprising a body and a head separated by a substantially flat element which breaks up the internal space into ducts for entry of the primary air and into ducts for the distribution of the gas/primary air mixture.

According to a main aspect, the invention thus relates to a burner as described in claim 1.

In particular, the invention relates to a burner for cookers, suitable for burning gas, comprising at least two gas crowns, of which a central one and at least one circumferential one, a central mixing chamber with Venturi effect, ducts for entry of the primary air, and radial ducts for feeding the gas/primary air mixture to the said at least one circumferential crown, characterized in that it comprises a body, a head, and a substantially flat internal element of separation designed to define the upper surfaces of said ducts for entry of the primary air and the lower surfaces of said radial ducts.

Preferred features of the burner of the invention are described in the dependent claims.

The invention will now be described in greater detail with particular reference to the attached figures exclusively by way of illustrative example.

BRIEF DESCRIPTION OF DRAWINGS

FIG. 4a is a schematic view of one half of the burner illustrated in FIG. 4.

FIG. 5 is a detail of the section C—C of FIG. 4a.

FIG. 6 is the section B—B of FIG. 2; and

BEST MODE FOR CARRYING OUT THE INVENTION

Figure 1:
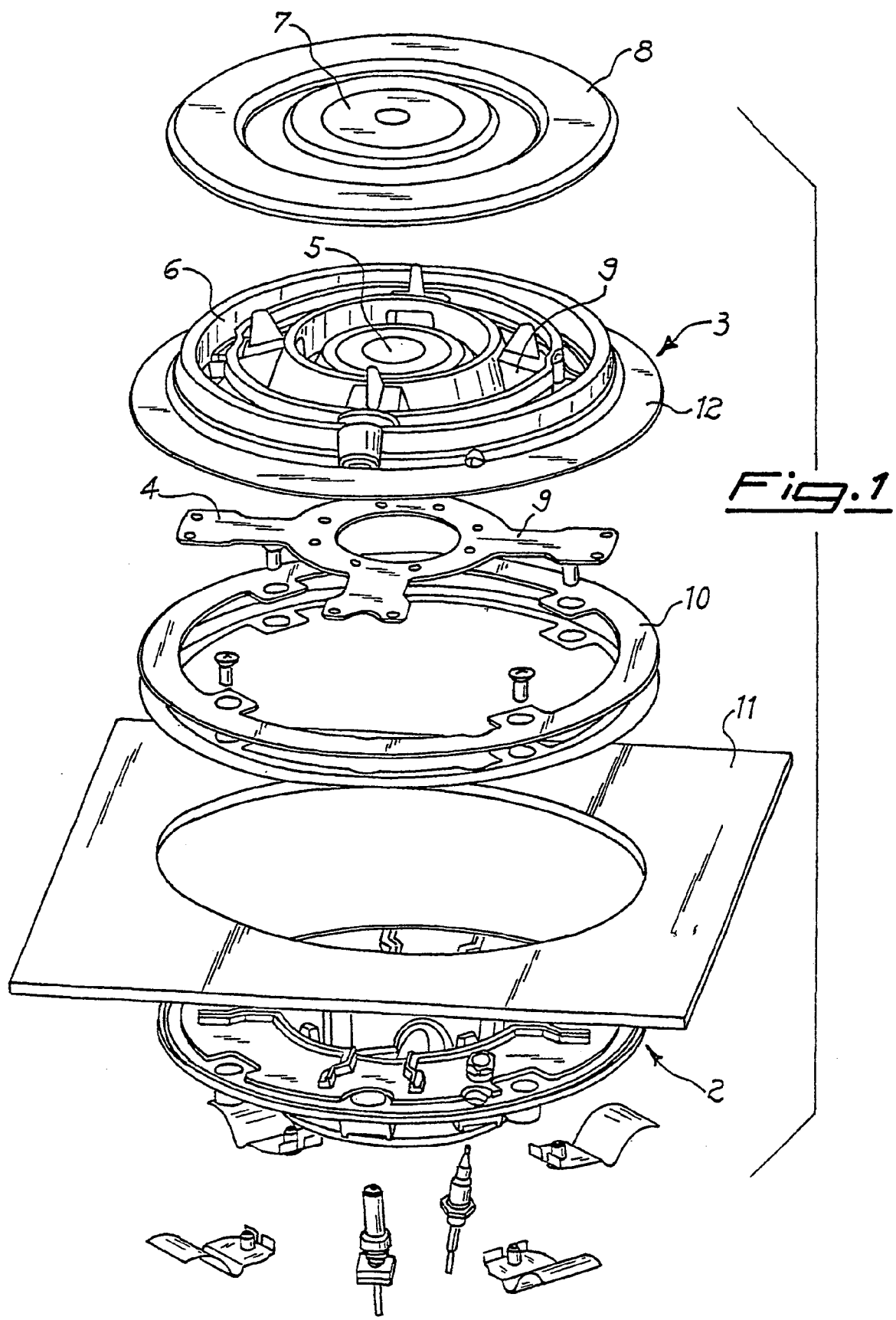
FIG. 1 is an exploded view of a burner according to the invention.

With reference to FIG. 1, a burner 1 according to the invention is shown which comprises a body 2, a head 3 and an interposed flat element 4; in the specific embodiment the interposed flat element 4 is shaped like a Celtic cross. Visible in the top portion of the head 3 are the central chamber 5 and the annular chamber 6 with the respective (central and circumferential) gas crowns which are covered with respective caps 7 and 8. The central chamber is connected to the annular chamber 6 by means of the radial ducts 9, the top and side walls of which are defined in the head 2, and the bottom walls of which are defined by the upper surface of the flat element 4, which is joined to the head 2 by means of screws or studs deformed by upsetting (studs being preferred). A possible skirt 12 protects the slits designed for the entry of primary air; in some embodiments this skirt may not be present, or alternatively it may be joined to the flat element 4. A seal element 10 may be present for recessing of the burner into pyroceram hobs. Recessing of the burner in the surface 11 is obtained by using conventional means, and appropriate optional elements may be used for recessing.

Figure 2:
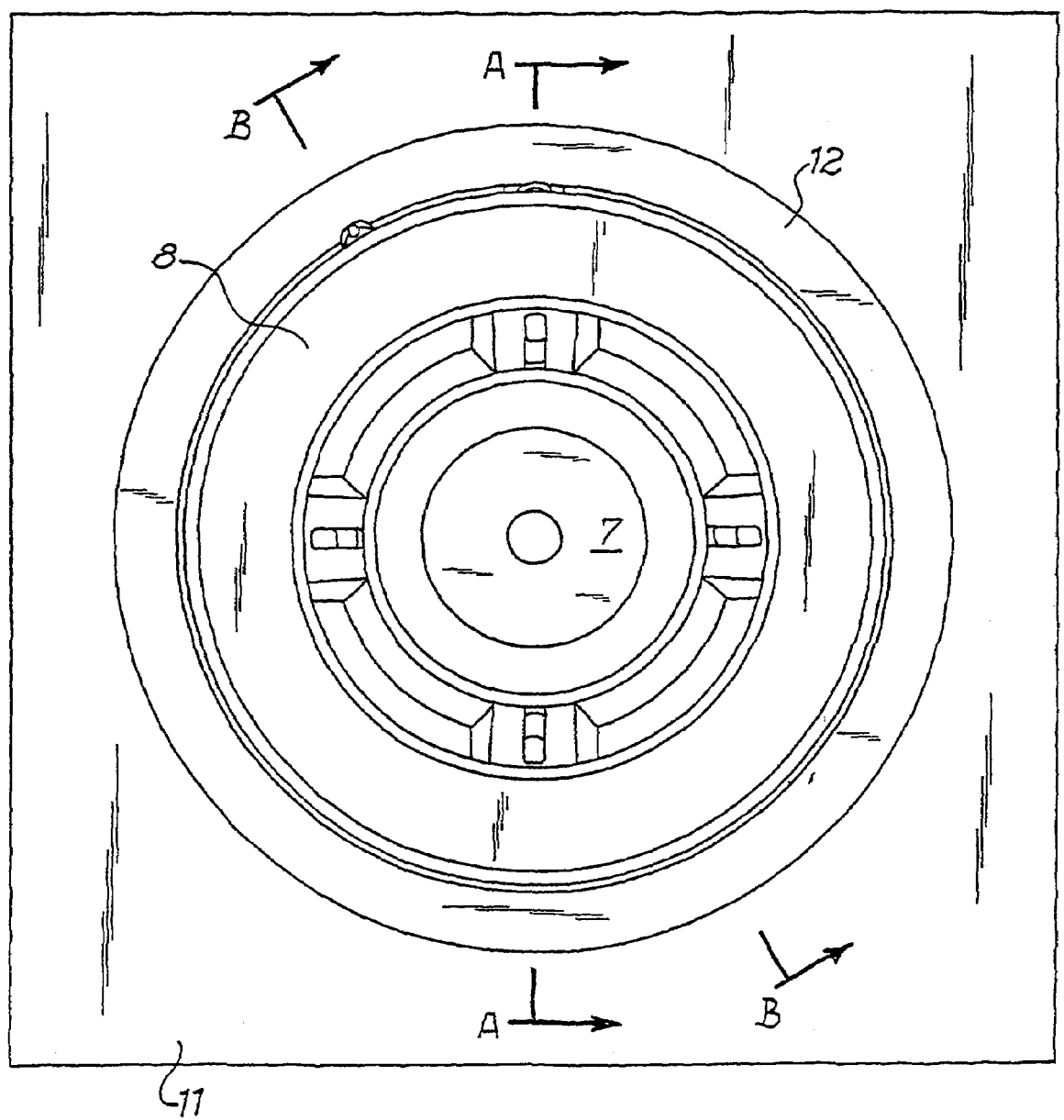
FIG. 2 is a view of the burner from above.

With reference to FIG. 2, the arrangement of the concentric gas crowns with the respective caps 7 and 8 is shown.

Figure 3:
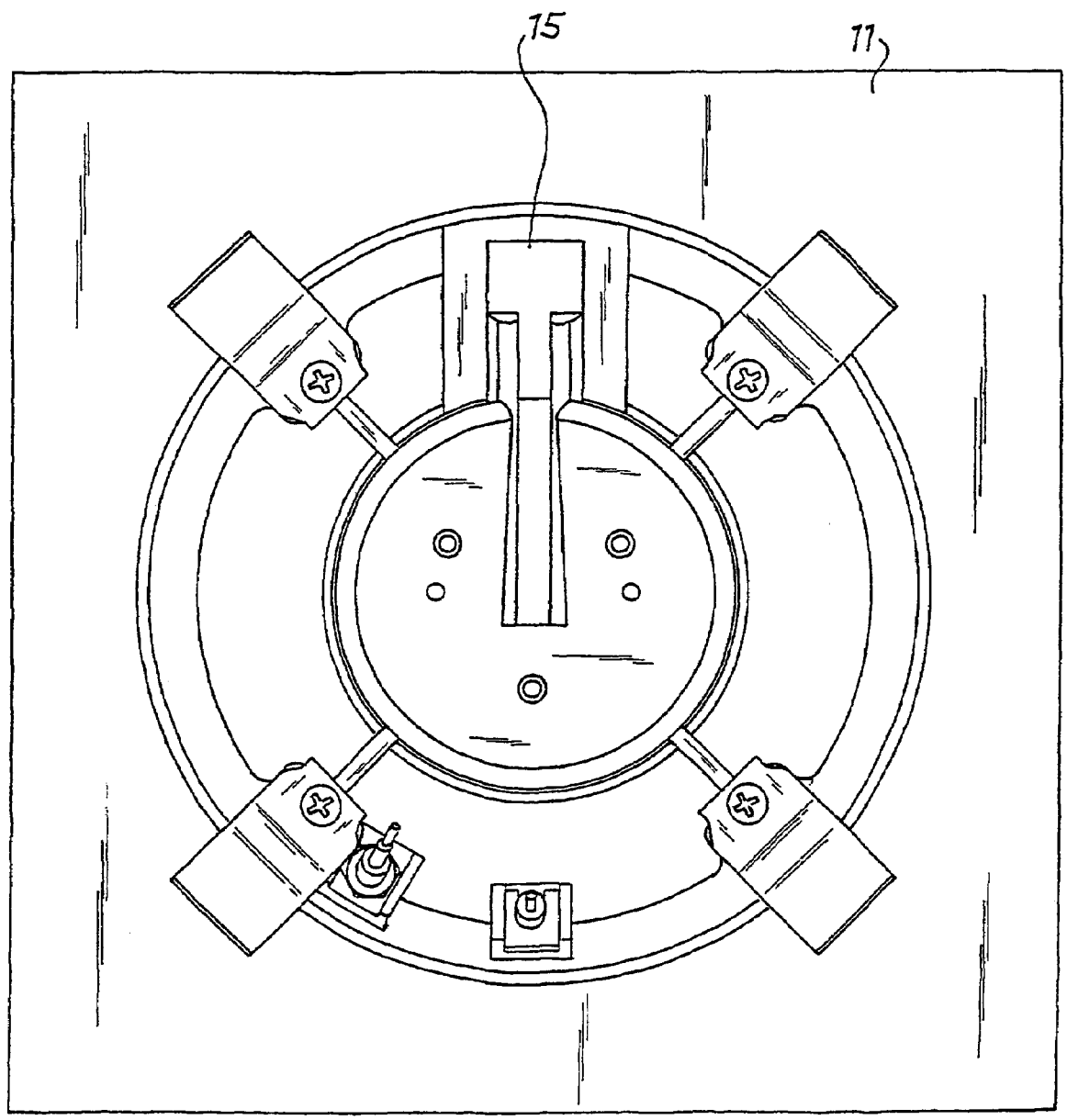
FIG. 3 is a view of the burner from below.

FIG. 3 shows a view from below of the burner and illustrates the feed of the gas by means of the duct 15.

Figure 4:
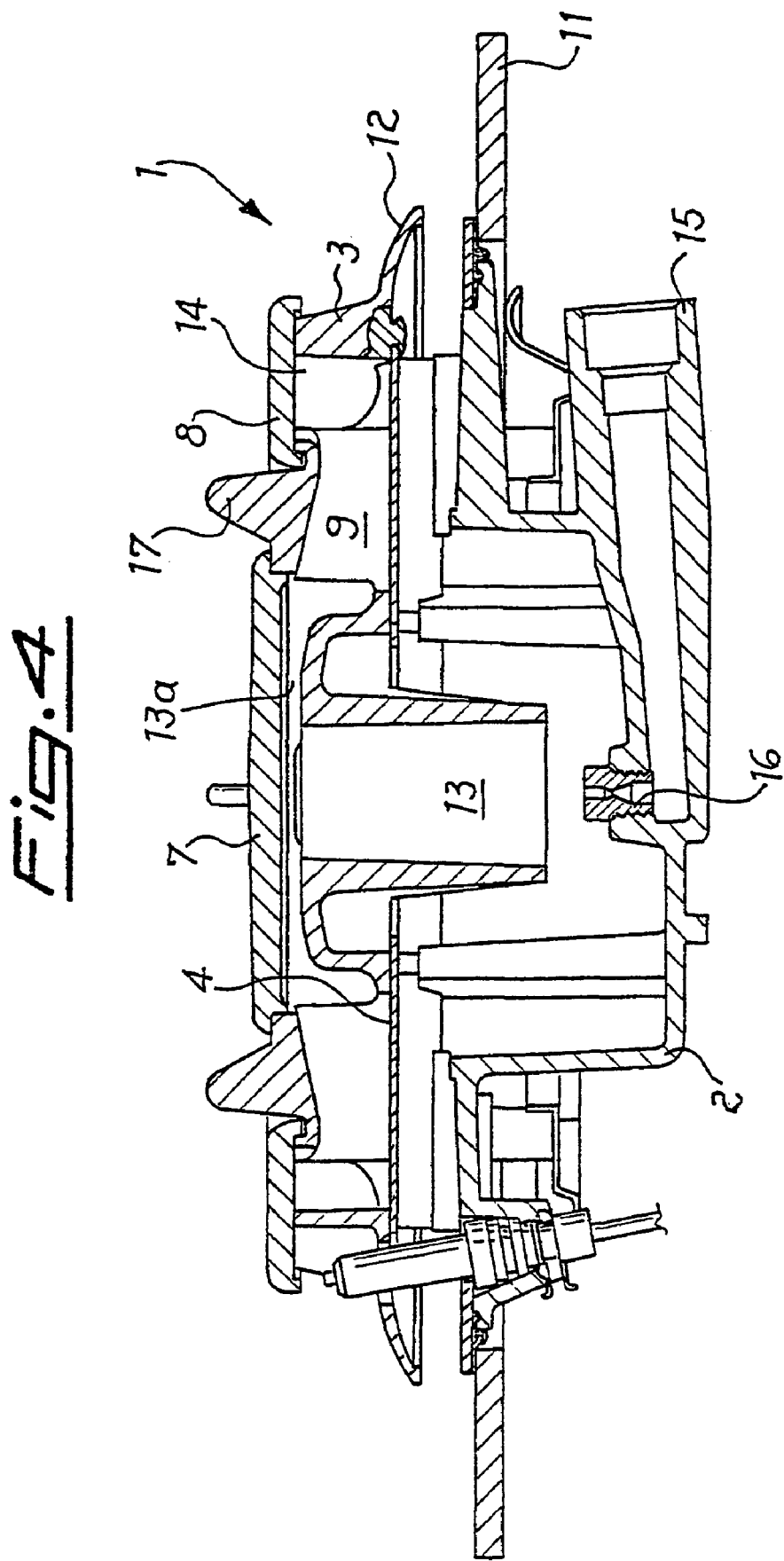
FIG. 4 is the section A—A of FIG. 2.

FIG. 4 shows the internal conformation of the body and of the head of the burner, in particular the feed duct 15, the nozzle 16 in the body 2, and the structure of the Venturi channel 13, 13a, of the possible skirt 12 and of blocking elements 17 for blocking the caps on the head 3.

FIG. 4a shows schematically, and for just one half, the diametral section of the burner of FIG. 2. In particular it may be noted that, in the body 2, there are ribs 18 which engage with complementary ribs 19 located on the head 3. The ribs 18 and 19, which are joined together when the burner is assembled, define channels communicating with the outside. The flat element 4 divides in the horizontal direction said channels into two, so breaking up the internal space and giving rise, at the bottom, to the ducts for entry of the primary air and, at the top, to the radial ducts 9 for distribution of the gas/primary air mixture to the annular chamber 14. The arrows indicate the path of the air at entry and after mixing with the gas that comes from the nozzle 16.

With reference to FIG. 5, it may be noted how the element 4 acts as internal separator defining two cavities, one for entry of the primary air indicated by the reference I and the other for the exit of the gas/primary air mixture in the annular chamber indicated by the reference M; also clearly visible in FIG. 5 are the ribs 18 and 19 and the ducts that they define.

With reference to FIG. 6, the parts making up the inside of the burner shown according to a different section are visible.

For operation of the burner, and again with reference to the specific technical solution illustrated in the figures, the primary air that penetrates through the slits made under the possible skirt 12 as indicated by the arrows is sucked into the Venturi channel 13, 13a, where it is mixed with the gas coming from the duct 5 and introduced by means of the nozzle 16. The gas/primary air mixture then ascends along the vertical and horizontal Venturi channel to reach the central crown underneath the central cap 7; from here, traversing the radial channels, as indicated by the arrows in FIG. 4a, it reaches the annular chamber 14 and the overlying crowns.

As has been said, the body and the head are preferably die-cast as in conventional burners.

The internal element 4 is preferably made of a piece of steel sheet and may assume different shapes, according to the conformation of the body and head of the burner. According to an advantageous feature, the element 4 is shaped like a Celtic cross to define four internal ducts and a circular area of separation of the internal space adjacent to the Venturi channel.

As has been seen previously, the element 4 may alternatively be made of a single piece with the skirt.

According to a preferred aspect, the central chamber, which prevalently has a horizontal Venturi effect, is defined by the surfaces set facing one another, one of which corresponds to the body of the burner and the other to the cap of the central gas crown.

The gas crowns of the burner may assume different conformations; according to a preferred embodiment, however, the gas crown is obtained by means of holes positioned on the upper edge of the external walls of the central chamber.

As clearly described later with reference to FIG. 7, the flame holes 201 of the central flame crown are tilted with respect to the vertical axis Y of the burner at an angle β of between 40 and 70 degrees. The tilt of the flame holes 201 was found to be particular efficient in order to obtain stable flames and uniform distribution of the heat over the burner.

Advantageously, the circumferential gas crowns are two in number and have notches on the internal and external edges of the annular chamber as described, for example, in the European patent application 0 903 538 in the name of the present applicant.

The caps 7 and 8 and/or the skirt 12, which is possibly present, may be made of different materials, for example steel or brass, and may, moreover, be enamelled in various chromatic shades according to the different ornamental requirements.

Thanks to the specific internal conformation, and in particular to the separation element 4 set between the two die-cast pieces 2 and 3, the burner of the invention represents a clear improvement with respect to known burners, overcoming the problems that these present and enabling production at contained costs.

EXAMPLE

Figure 7:
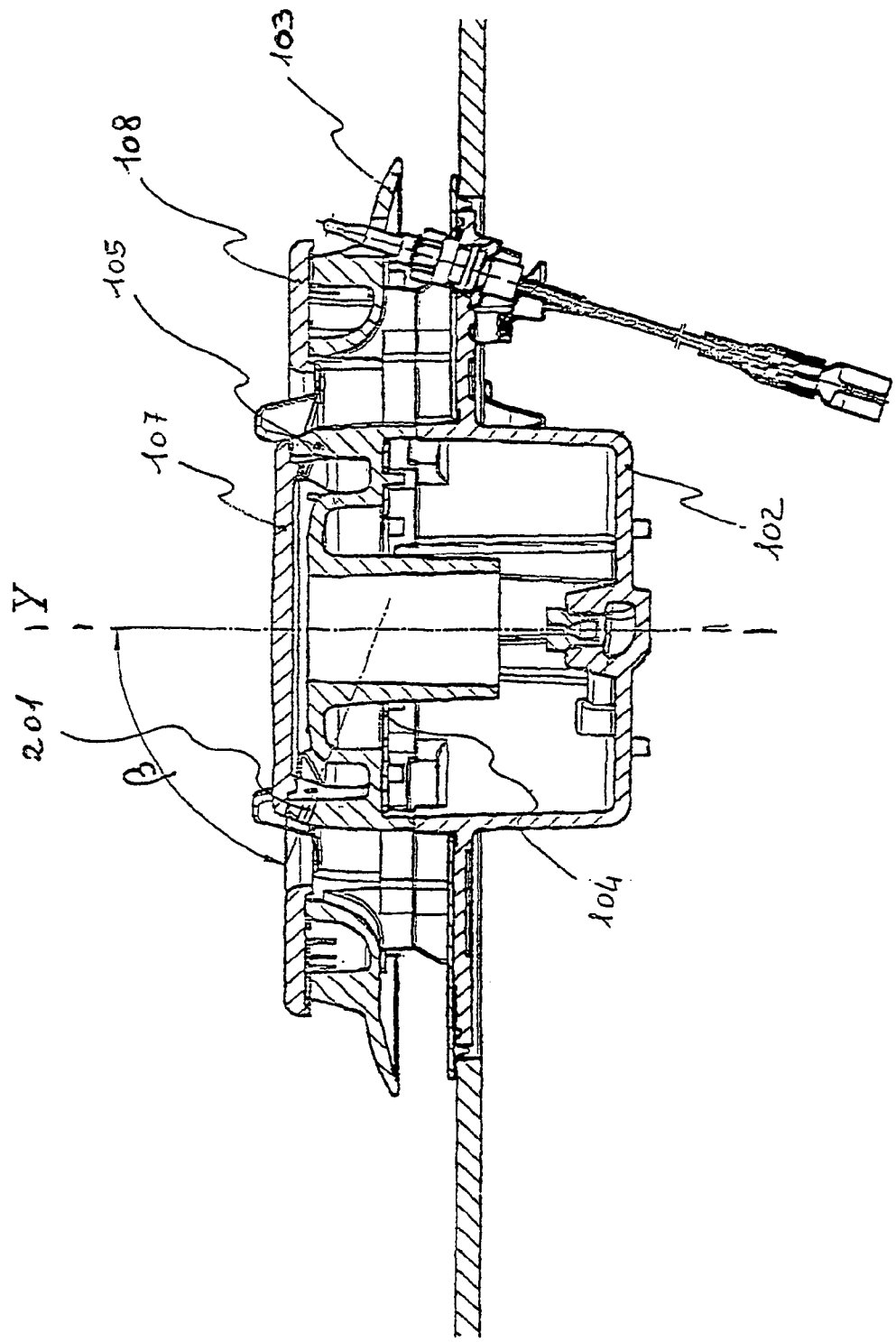
FIG. 7 is a sectional view of a burner according to another embodiment of the present invention.

With reference now to FIG. 7, showing an example of embodiment of the present invention, the burner body 102 and the burner head 103 are made in aluminium alloy (Al—Si and/or Al—Ni) or brass by die-casting and the flat internal element 109 is obtained by drawing a steel, stainless steel, or brass sheet.

Furthermore, the holes 201 of the central flame crown are realized on the peripheral wall of the central chamber 105 and they are tilted with respect to the vertical axis Y of the burner at an angle β of between 40 and 70 degrees.

What is claimed is:

1. A gas cooking burner comprising:
   a body;
   a head located above said body, thereby defining an internal space therebetween;
   said head defining a Venturi channel and including a central crown and a circumferential crown, and a separation element disposed between said body and said head for dividing said internal space into at least one entry duct for entry of primary air and at least one radial duct for distributing a mixture of gas and primary air within said burner to said circumferential crown, said at least one radial duct including a top wall defined by said head, a side wall defined by said head or said body, and a bottom wall defined by said separation element.

2. The burner according to claim 1, wherein said separation element comprises a steel sheet.

3. The burner according to claim 1, wherein said body further comprises at least one rib and said head includes at least one corresponding rib in engagement with said at least one rib for defining at least one channel in said entry duct.

4. The burner according to claim 3, wherein said separation element divides said at least one channel into a channel portion of said at least one entry duct and a channel portion of said at least one radial duct.

5. The burner according to claim 1, wherein said at least one entry duct comprises four entry ducts and said at least one radial duct comprises four radial ducts.

6. The burner according to claim 1, wherein said separation element is in the shape of a Celtic cross.

7. The burner according to claim 1, wherein said head further comprises a skirt, and said separation element is attached to said skirt.

8. The burner according to claim 1, wherein said burner further comprises a cap and said cap comprises steel or brass.

9. The burner according to claim 8 wherein said head further comprises a skirt and said skirt comprises steel or brass.

10. The burner according to claim 9 wherein said steel or brass comprises enameled steel or brass.

11. The burner according to claim 1, wherein said central flame crown includes a flame hole, said flame hole tilted with respect to the vertical axis of said burner at an angle ranging from 40 to 70 degrees.

* * * * *

UNITED STATES PATENT AND TRADEMARK OFFICE
CERTIFICATE OF CORRECTION

PATENT NO. : 7,001,176 B2
DATED : February 21, 2006
INVENTOR(S) : Angelo Bettinzoli Page 1 of 1

It is certified that error appears in the above-identified patent and that said Letters Patent is hereby corrected as shown below:

<u>Title page,</u>
Item [30], Foreign Application Priority Data, "Jul. 23, 2003" should read -- Jul. 6, 2000 --.

Signed and Sealed this

Second Day of May, 2006

JON W. DUDAS
*Director of the United States Patent and Trademark Office*